US009061413B2

(12) United States Patent
Huang

(10) Patent No.: US 9,061,413 B2
(45) Date of Patent: Jun. 23, 2015

(54) MECHANIC'S CREEPER

(71) Applicant: HIEVER CO., LTD., Taichung (TW)

(72) Inventor: Tony Huang, Taichung (TW)

(73) Assignee: HIEVER CO., LTD., Taichung (TW)

( * ) Notice: Subject to any disclaimer, the term of this patent is extended or adjusted under 35 U.S.C. 154(b) by 0 days.

(21) Appl. No.: 14/484,924

(22) Filed: Sep. 12, 2014

(65) Prior Publication Data

US 2015/0084293 A1 Mar. 26, 2015

(30) Foreign Application Priority Data

Sep. 26, 2013 (TW) ............................. 102218039 U

(51) Int. Cl.
*B25H 5/00* (2006.01)
*B60Q 1/24* (2006.01)

(52) U.S. Cl.
CPC ... *B25H 5/00* (2013.01); *B60Q 1/24* (2013.01)

(58) Field of Classification Search
USPC .................... 280/32.5, 32.6, 639, 640, 87.01, 280/87.021, 87.05, 47.34, 79.11, 79.2; 362/486
See application file for complete search history.

(56) References Cited

U.S. PATENT DOCUMENTS

| | | | | | |
|---|---|---|---|---|---|
| 4,698,731 | A * | 10/1987 | Johns, Sr. | ...................... | 362/486 |
| 5,494,305 | A * | 2/1996 | Chen | ............................ | 280/32.6 |
| 6,802,636 | B1 * | 10/2004 | Bailey, Jr. | ..................... | 362/555 |
| 6,969,077 | B2 * | 11/2005 | Liu | ................................ | 280/30 |
| 7,481,438 | B2 * | 1/2009 | Hernandez | ................... | 280/32.6 |
| 8,403,525 | B2 * | 3/2013 | Prosey | .......................... | 362/234 |
| 2012/0235371 | A1 * | 9/2012 | Smith | .......................... | 280/32.6 |

* cited by examiner

*Primary Examiner* — John Walters
(74) *Attorney, Agent, or Firm* — Muncy, Geissler, Olds & Lowe, P.C.

(57) ABSTRACT

A mechanic's creeper includes a front frame, a middle frame and a back frame. The front frame is configured to rotate with respect to the middle frame, and the middle frame is configured to rotate with respect to the back frame. A front pad mounted on the front frame has a top surface provided with a groove in which an LED strip light is received. The middle frame is pivotally connected to a bracket. The bracket is configured to rotate with respect to the middle frame between a position where it is parallel to the middle frame to a position where it is parallel to the back frame.

17 Claims, 8 Drawing Sheets

MECHANIC'S CREEPER

BACKGROUND OF THE INVENTION

1. Technical Field

The present invention relates to tools for mechanics, and more particularly to a multi-function mechanic's creeper.

2. Description of Related Art

In many working sties, mechanics use auxiliary equipment to facilitate their operations. For example, when performing car maintenance, mechanics have to work around the cars and even under the chassis and may need various auxiliary apparatuses, such as chairs, creepers, lighting devices and so on. Generally, those auxiliary apparatuses are independent from each other and dispersed, so the management is inconvenient, and there is a need for a device that integrates various functions.

SUMMARY OF THE INVENTION

In view of the foregoing need, one objective of the present invention is to provide a multifunction mechanic's creeper.

For achieving the foregoing objective, according to the present invention, a mechanic's creeper comprises a front frame, a middle frame, and a back frame. The front frame is configured to rotate with respect to the middle frame, and the middle frame is configured to rotate with respect to the back frame. The front frame is atop provided with a front pad on whose top surface a U-like groove is provided for receiving an LED strip light to be installed therein. The middle frame is pivotally connected to a bracket that is configured to rotate with respect to the middle frame between a position where it is parallel to middle frame to another position where it is parallel to the back frame.

DETAILED DESCRIPTION OF THE INVENTION

Figure 1:
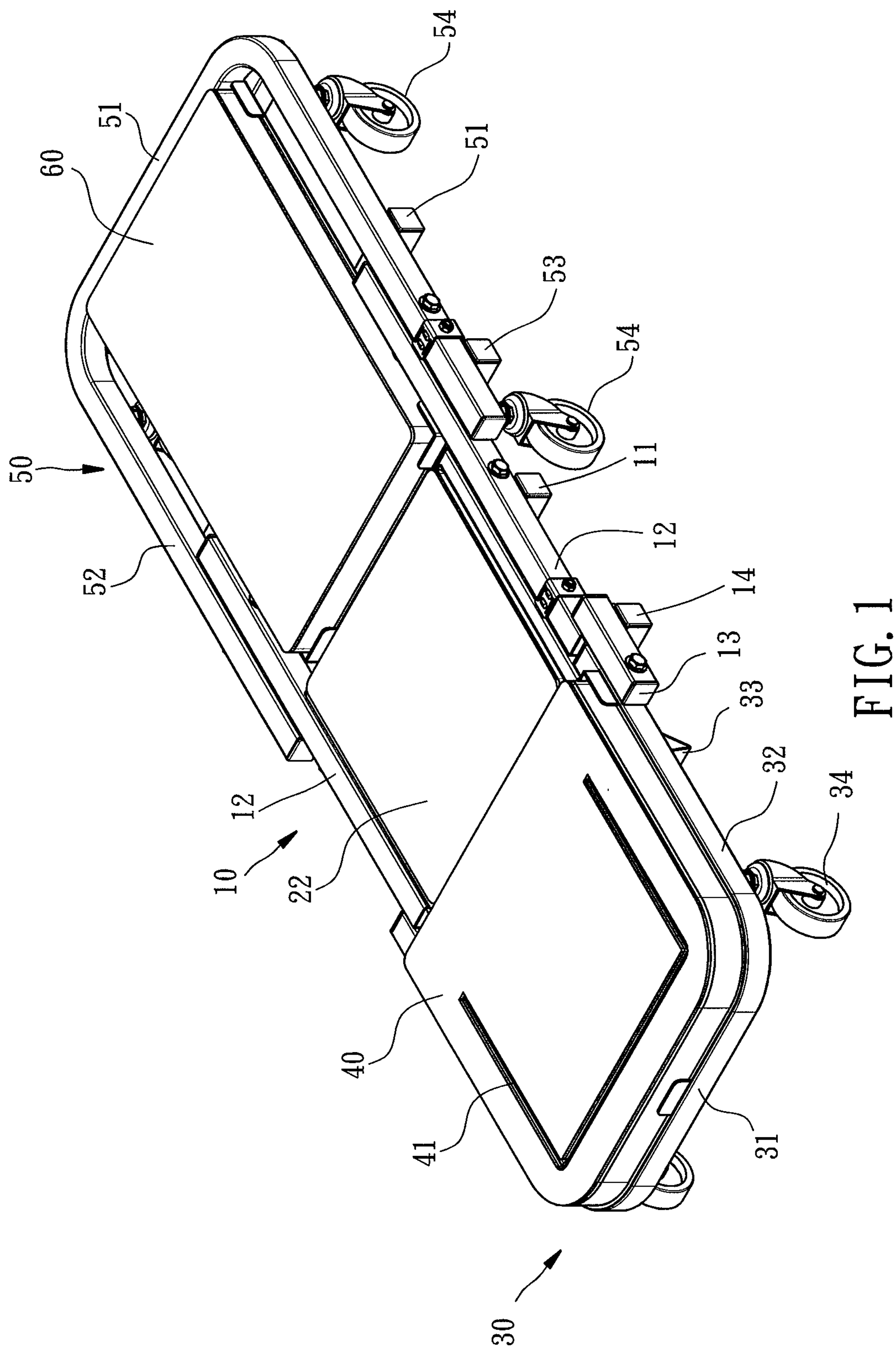
FIG. 1 is a top perspective view of the present invention.

Referring to FIG. 1 through FIG. 6, according to the present invention, a mechanic's creeper comprises a middle frame 10, a bracket 20, a front frame 30, a front pad 40, a back frame 50, and a back pad 60.

The middle frame 10 is constructed from two transverse rods 11 spanning over two lateral rods 12. An extension rod 13 is provided at one end of each of the two lateral rods 12. A retaining block 14 is attached to each of the extension rods 13 and the corresponding lateral rod 12. The retaining block 14 has a supporting surface 141. Each of the two lateral rods 12 has an opposite end provided with a salient 15. Each of the salients 15 has a ramp 151. A transverse rod of the middle frame 10 has two salients 16 formed at one side the transverse rod. Each of the salients has a ramp 161.

The bracket 20 is constructed from four rods 21. The bracket 20 is pivotally connected between the two lateral rods

12 of the middle frame and is configured to rotate with respect to the middle frame 10. A pad 22 is provided at one side of the bracket 20. In the present embodiment, the bracket is a rectangular member.

The front frame 30 is constructed from two transverse rods 31 and two lateral rods 32. The two lateral rods 32 of the front frame are pivotally connected to the two lateral rods 12 of the middle frame 10, respectively. A salient 33 is provided at a bottom surface of each of the two lateral rods 32 of the front frame 30. Each of the salients has a ramp 331. The front frame 30 is configured to rotate with respect to the middle frame 10. A caster 34 is assembled to a bottom surface of each of the two lateral rods of the front frame 30. A switch 35 is deposited at one side of the front frame 30.

The front pad 40 is mounted on a top surface of the front frame 30. The front pad 40 has its top surface formed with a groove 41. The groove 40 has a U-like profile. An LED strip light is installed in the groove 41. A battery compartment 42 is formed on a bottom surface of the front pad 40, and is connected to the switch 35 of the front frame 30, so that a battery fitted in the battery compartment 42 can power the LED strip light.

The back frame 50 is constructed from two transverse rods 51 and two lateral rods 52. The two lateral rods 52 of the back frame 50 are pivotally connected to the two lateral rods 12 of the middle frame 10, respectively. A retaining block 53 and a caster 54 are provided on a bottom surface of each of the two lateral rods 52 of the back frame 50.

The back pad 60 is mounted on a top surface of the back frame 50. The back pad 60 is configured to be detached and used independently as a hassock.

Figure 2:
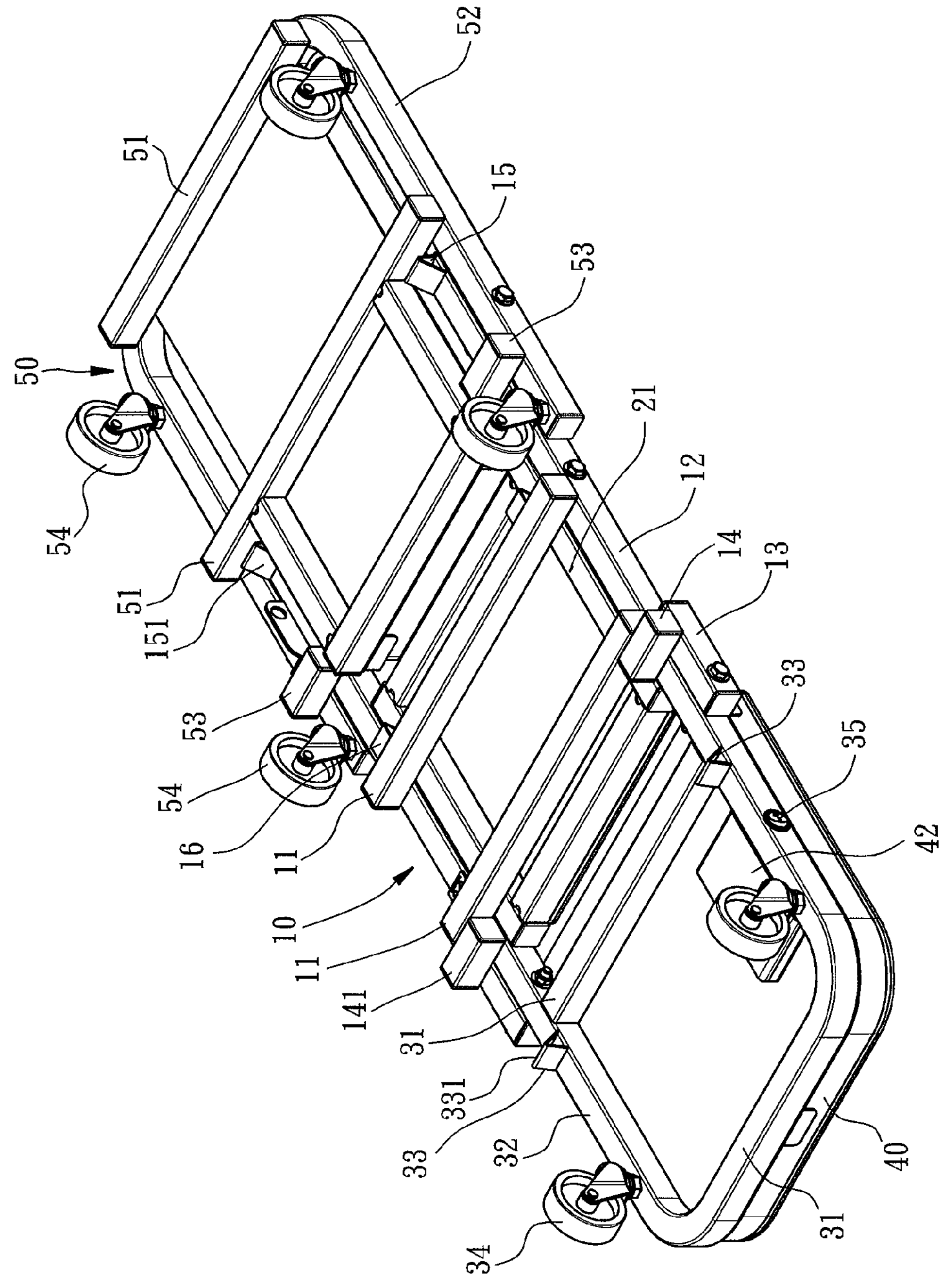
FIG. 2 is a bottom perspective view of the present invention.
Figure 3:
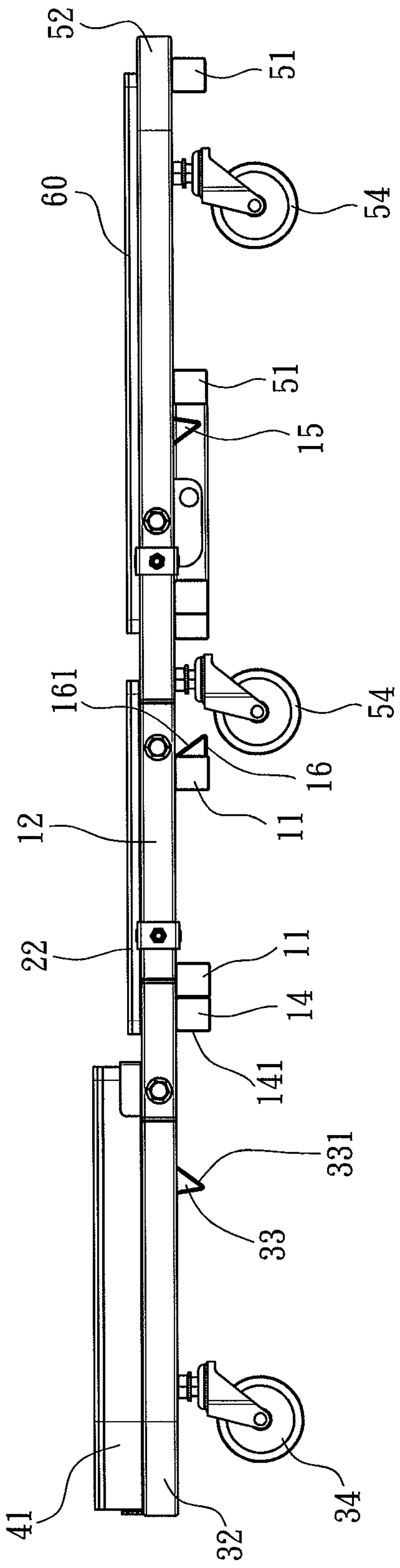
FIG. 3 is a side view of the present invention.

With the foregoing configuration, the present invention in use can be adapted to various applications and display different forms. As shown in FIG. 1 through FIG. 3, the present invention, when fully expanded, acts as a mechanic's creeper. At this time, each of the two lateral rods 32 of the front frame has one end thereof propping against the retaining block 14 of the corresponding two lateral rod of the middle frame, and the two lateral rods 12 of the middle frame prop against the retaining blocks 53 of the two lateral rods of the back frame, so the assembly as a whole presents a flat structure. In other words, the front pad 40, the pad 22 and the back pad 60 are all at the same side of the mechanic's creeper, so a user can lie on the pads. Moreover, since the front pad 40 is equipped with the LED strip light, when a user lies thereon and performs maintenance works, the LED strip light installed on the front pad can provide direct illumination to the user, thereby freeing the user from the need of additional lighting devices.

Figure 4:
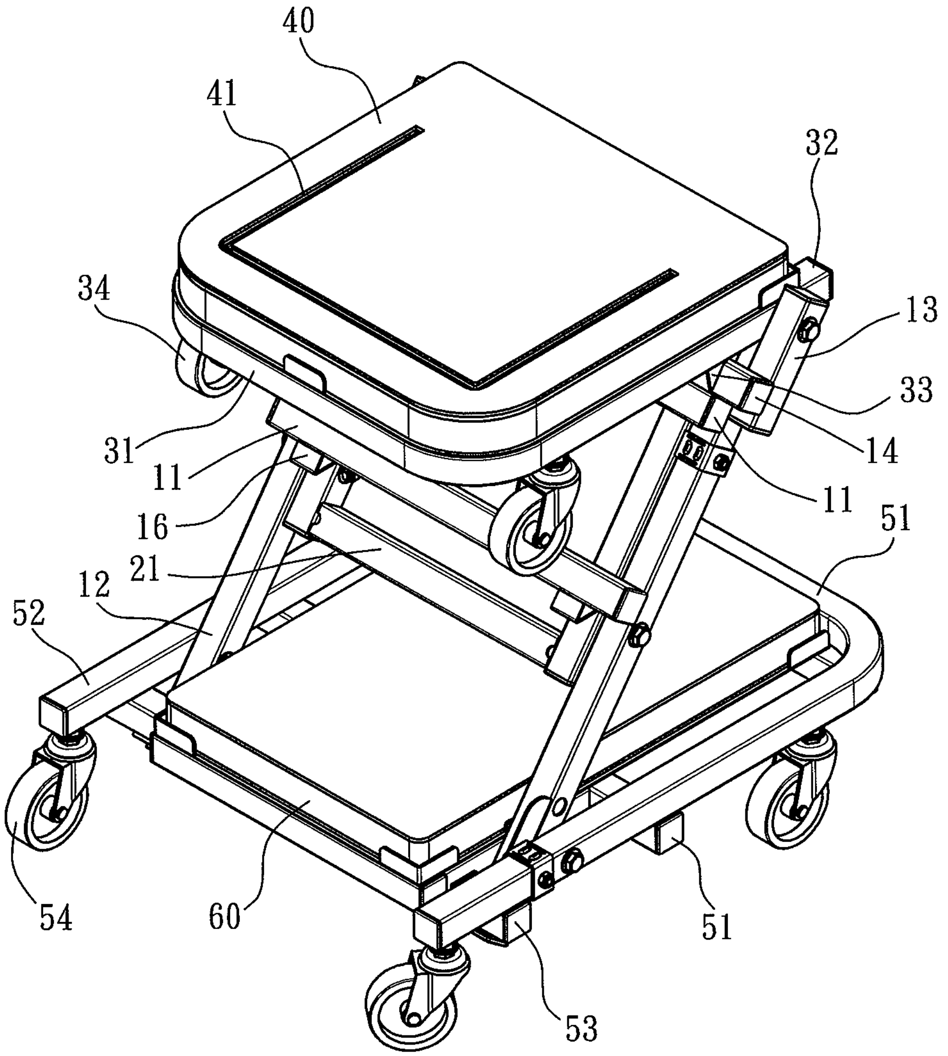
FIG. 4 is a post-rotation perspective view of the present invention.
Figure 5:
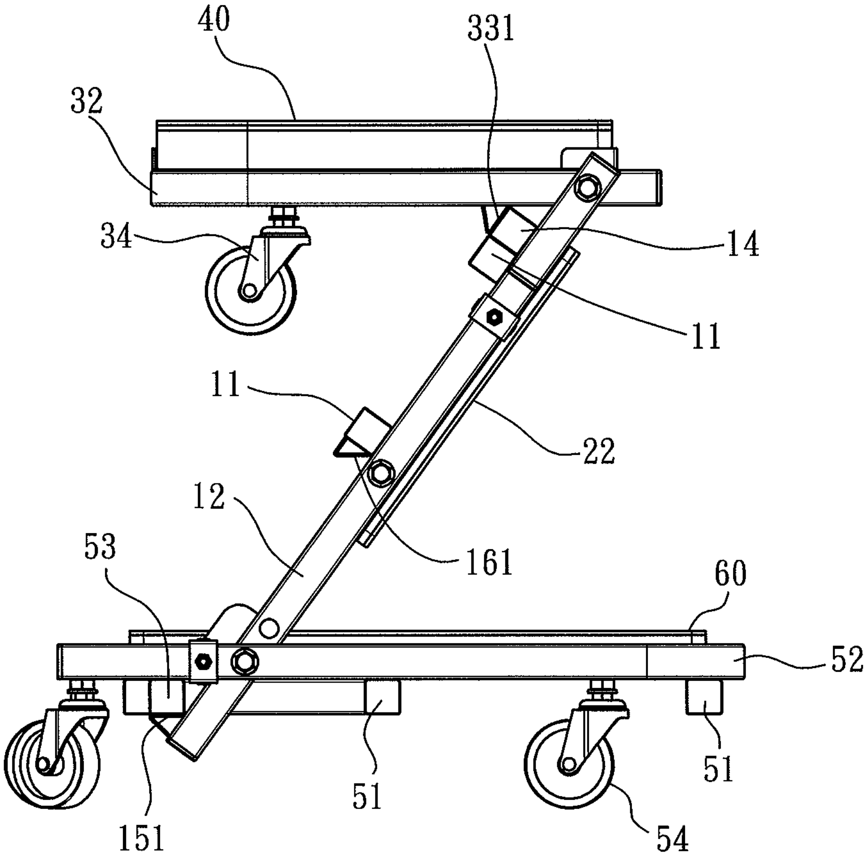
FIG. 5 is a side view of FIG. 4.
Figure 6:
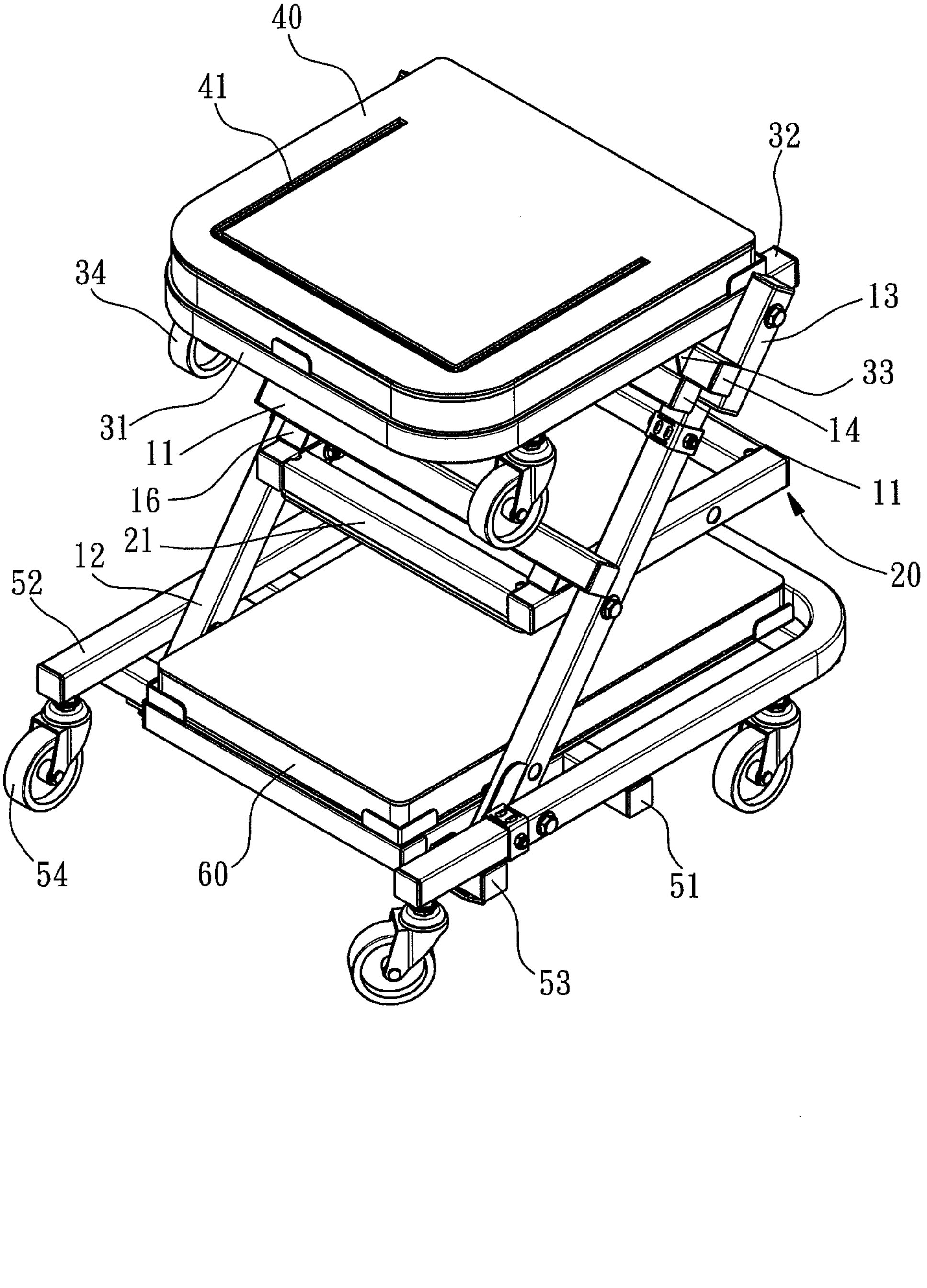
FIG. 6 is a perspective view of the present invention, showing its bracket is laid down.
Figure 7:
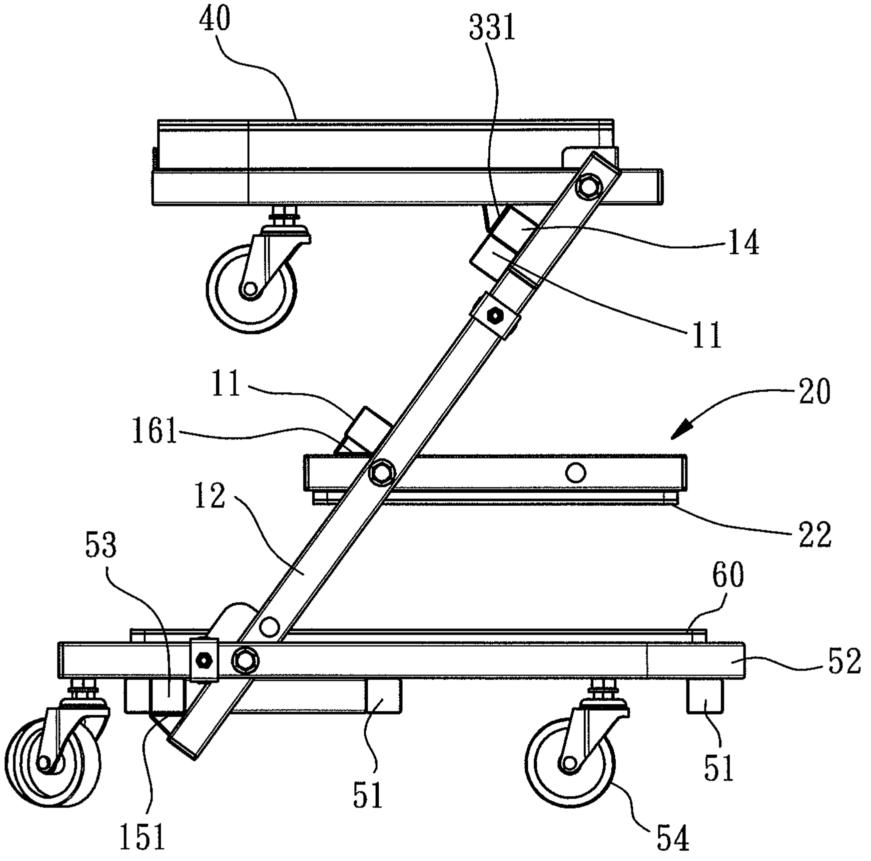
FIG. 7 is a side view of FIG. 6.

Furthermore, the present invention can be transformed into a chair. Referring to FIG. 4 and FIG. 5, the middle frame 10 can be rotated with respect to the back frame 50, so that the salients 15 of the two lateral rods of the middle frame prop against the retaining blocks 53 of the two lateral rods of the back frame. In virtue of the coordination of each said salient ramp 151 and its corresponding retaining block 53, the rotated middle frame 10 can be fixed at a certain angle with respect to the back frame 50. The front frame 30 can also be rotated with respect to the middle frame 10 to the extent that the salients 33 of the front frame prop against the retaining blocks 14 of the two lateral rods of the middle frame. In virtue of the coordination of each said salient ramp 331 and its corresponding retaining block 14, the rotated front frame 30 can be fixed at a certain angle with respect to the middle frame 10, so that the front frame 30 is nearly parallel to back frame 50. At this time, the front pad 40 on the front frame 30 can act as a seat for a user to sit thereon. Referring to FIG. 6 and FIG. 7, at this time, the bracket 20 can also be rotated with respect to the middle frame 10, so that the bracket 20 is shifted between a position where it is parallel to the middle frame 10 and a position where it is parallel to the back frame 50. At this time, the rods 21 of the bracket prop against the salients 16 at one side of the transverse rod 11 of the middle frame. The coordination of the salient's ramps 161 and the bracket rods 21 allows the bracket 20 to be held at a position where it is parallel to the back frame 50. Thereby, the bottom surface of the bracket 20 can act as a tray for receiving tools, so that a user sitting on the front pad 40 and performing maintenance works can take and place tools from and back to the tray conveniently.

Thus, the present invention can be used as not only a creeper having illumination but also a working chair with an under-seat tool tray. Furthermore, the back pad can be detached and used independently as a hassock, so that the single inventive structure can provide multiple functions.

Figure 8:
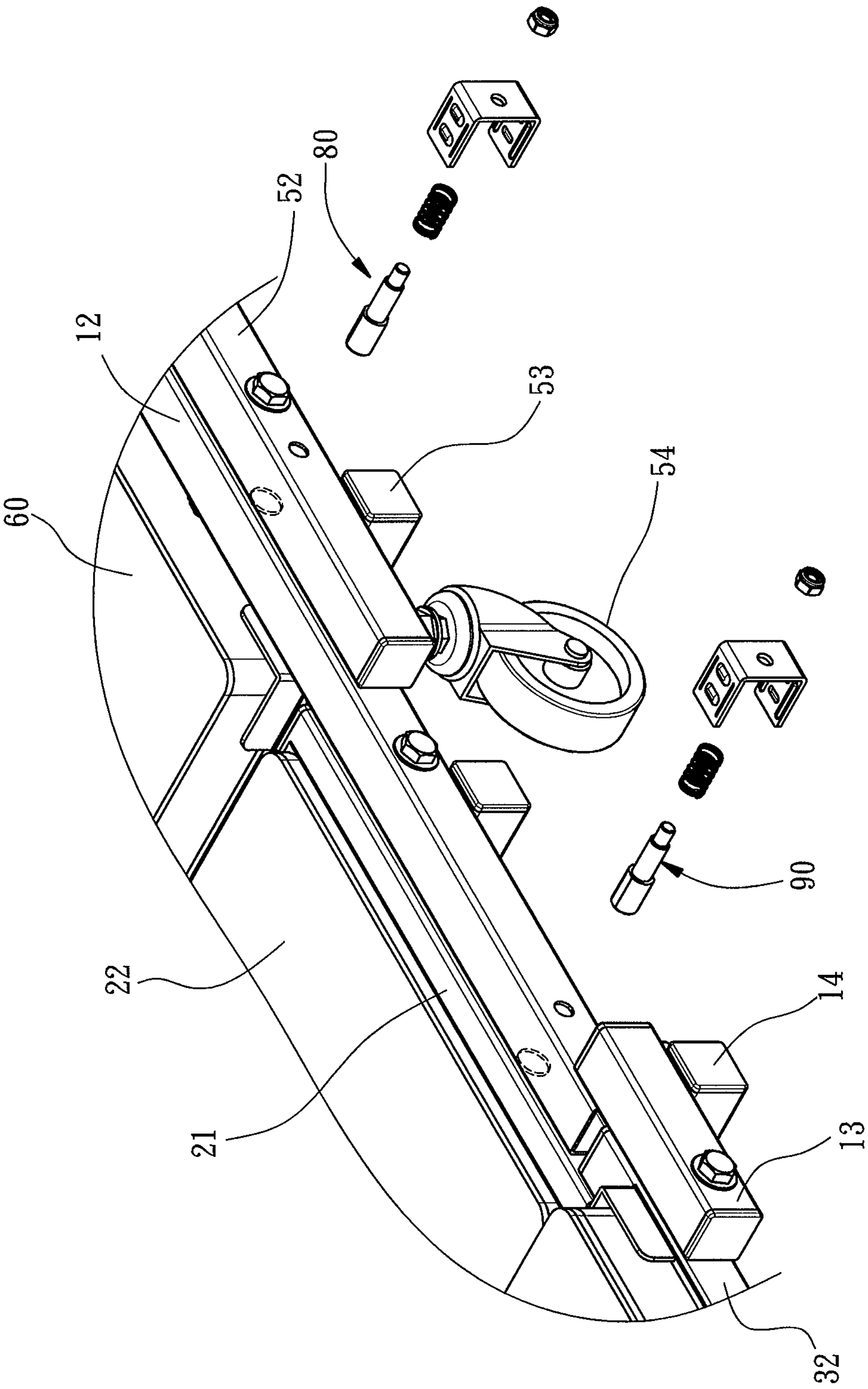
FIG. 8 is a partial, enlarged view of FIG. 1.

Additionally, as shown in FIG. 8, for ensuring the stability of the disclosed assembly in use, a horizontal pin 80 is provided at a lateral rod 52 of the back frame. The horizontal pin 80 passes through the lateral rod 52 of the back frame and the corresponding lateral rod 12 of the middle frame, so that the middle frame 10 is fixed in place and prevented from rotating with respect to the back frame 50. When the horizontal pin 80 is withdrawn, the middle frame is again rotatable with respect to the back frame.

Moreover, for fastening the bracket 20, another horizontal pin 90 is assembled to one lateral rod 12 of the middle frame 10. The horizontal pin 90 passes through the lateral rod 12 of the middle frame and the corresponding rod 21 of the bracket, so that the bracket 20 is fixed in place and prevented from rotating with respect to the middle frame 10. When the horizontal pin 90 is withdrawn, the bracket 20 is again rotatable with respect to the middle frame 10.

What is claimed is:

1. A mechanic's creeper, comprising:

a middle frame, being constructed from two transverse rods spanning over two lateral rods, an extension rod being provided at one end of each of the two lateral rods, a retaining block being attached to each of the extension rods and the corresponding lateral rod, and the retaining block having a supporting surface;

a bracket, being constructed from four rods, the bracket being pivotally connected between the two lateral rods of the middle frame and being configured to rotate with respect to the middle frame, and a pad being provided at one side of the bracket;

a front frame, being constructed from two transverse rods and two lateral rods, the two lateral rods of the front frame being pivotally connected to the two lateral rods of the middle frame, respectively a salient being provided at a bottom surface of each of the two lateral rods of the front frame, each of the salients having a ramp, the front frame being configured to rotate with respect to the middle frame, a caster being assembled to the bottom surface of each of the two lateral rods of the front frame;

a front pad, being mounted on a top surface of the front frame, the front pad having a top surface thereof formed with a groove for receiving an LED strip light to be installed therein;

a back frame, being constructed from two transverse rods and two lateral rods, the two lateral rods of the back frame being pivotally connected to the two lateral rods of the middle frame, respectively, a retaining block and two casters being provided on a bottom surface of each of the two lateral rods of the back frame; and a back pad, being mounted on a top surface of the back frame;

wherein each of the two lateral rods of the middle frame has an opposite end provided with a salient, and each of the salients has a ramp.

2. The mechanic's creeper of claim 1, wherein the middle frame is configured to rotate with respect to the back frame to an extent that the ramp of the salient props against the retaining block of the back frame.

3. The mechanic's creeper of claim 1, wherein a horizontal pin is assembled to one of the lateral rods of the middle frame by passing through the lateral rod of the middle frame and one corresponding said rod of the bracket, so that the bracket is fixed in place and prevented from rotating with respect to the middle frame, and that when the horizontal pin is withdrawn, the bracket is again rotatable with respect to the middle frame.

4. The mechanic's creeper of claim 1, wherein a horizontal pin is assembled to one of the lateral rods of the back frame by passing through the lateral rod of the back frame and one corresponding said lateral rod of the middle frame, so that the middle frame is fixed in place and prevented from rotating with respect to the back frame, and that when the horizontal pin is withdrawn, the middle frame is again rotatable with respect to the back frame.

5. The mechanic's creeper of claim 1, wherein the bracket is configured to rotate with respect to the middle frame between a position where the bracket is parallel to the middle frame and a position where the bracket is parallel to the back frame.

6. The mechanic's creeper of claim 1, wherein a battery compartment being formed on a bottom surface of the front pad, so that a battery fitted in the battery compartment powers the LED strip light.

7. A mechanic's creeper, comprising:

a middle frame, being constructed from two transverse rods spanning over two lateral rods, an extension rod being provided at one end of each of the two lateral rods, a retaining block being attached to each of the extension rods and the corresponding lateral rod, and the retaining block having a supporting surface;

a bracket, being constructed from four rods, the bracket being pivotally connected between the two lateral rods of the middle frame and being configured to rotate with respect to the middle frame, and a pad being provided at one side of the bracket;

a front frame, being constructed from two transverse rods and two lateral rods, the two lateral rods of the front frame being pivotally connected to the two lateral rods of the middle frame, respectively a salient being provided at a bottom surface of each of the two lateral rods of the front frame, each of the salients having a ramp, the front frame being configured to rotate with respect to the middle frame, a caster being assembled to the bottom surface of each of the two lateral rods of the front frame;

a front pad, being mounted on a top surface of the front frame, the front pad having a top surface thereof formed with a groove for receiving an LED strip light to be installed therein;

a back frame, being constructed from two transverse rods and two lateral rods, the two lateral rods of the back frame being pivotally connected to the two lateral rods of the middle frame, respectively, a retaining block and two casters being provided on a bottom surface of each of the two lateral rods of the back frame; and a back pad, being mounted on a top surface of the back frame;

wherein the middle frame has a side of one of the transverse rods provided with two salients, and each of the salients has a ramp.

8. The mechanic's creeper of claim 7, wherein the bracket is configured to rotate with respect to the middle frame to an extent that the rods of the bracket prop against the ramps of the two salients.

9. The mechanic's creeper of claim 7, wherein a horizontal pin is assembled to one of the lateral rods of the middle frame by passing through the lateral rod of the middle frame and one corresponding said rod of the bracket, so that the bracket is fixed in place and prevented from rotating with respect to the middle frame, and that when the horizontal pin is withdrawn, the bracket is again rotatable with respect to the middle frame.

10. The mechanic's creeper of claim 7, wherein a horizontal pin is assembled to one of the lateral rods of the back frame by passing through the lateral rod of the back frame and one corresponding said lateral rod of the middle frame, so that the middle frame is fixed in place and prevented from rotating with respect to the back frame, and that when the horizontal pin is withdrawn, the middle frame is again rotatable with respect to the back frame.

11. The mechanic's creeper of claim 7, wherein the bracket is configured to rotate with respect to the middle frame between a position where the bracket is parallel to the middle frame and a position where the bracket is parallel to the back frame.

12. The mechanic's creeper of claim 7, wherein a battery compartment being formed on a bottom surface of the front pad, so that a battery fitted in the battery compartment powers the LED strip light.

13. A mechanic's creeper, comprising:

a middle frame, being constructed from two transverse rods spanning over two lateral rods, an extension rod being provided at one end of each of the two lateral rods, a retaining block being attached to each of the extension rods and the corresponding lateral rod, and the retaining block having a supporting surface;

a bracket, being constructed from four rods, the bracket being pivotally connected between the two lateral rods of the middle frame and being configured to rotate with respect to the middle frame, and a pad being provided at one side of the bracket;

a front frame, being constructed from two transverse rods and two lateral rods, the two lateral rods of the front frame being pivotally connected to the two lateral rods of the middle frame, respectively a salient being provided at a bottom surface of each of the two lateral rods of the front frame, each of the salients having a ramp, the front frame being configured to rotate with respect to the middle frame, a caster being assembled to the bottom surface of each of the two lateral rods of the front frame;

a front pad, being mounted on a top surface of the front frame, the front pad laving a top surface thereof formed with a groove for receiving LED strip light to be installed therein;

a back frame, being constructed from two transverse rods and two lateral rods, the two lateral rods of the back frame being pivotally connected to the two lateral rods of the middle frame, respectively, a retaining block and two casters being provided on a bottom surface of each of the two lateral rods of the back frame; and a back pad, being mounted on a top surface of the back frame;

wherein the front frame is configured to rotate with respect to the middle frame to an extent that the ramps of the salients of the front frame prop against the supporting surfaces of the retaining blocks of the middle frame.

14. The mechanic's creeper of claim 13, wherein a horizontal pin is assembled to one of the lateral rods of the middle frame by passing through the lateral rod of the middle frame and one corresponding said rod of the bracket, so that the bracket is fixed in place and prevented from rotating with respect to the middle frame, and that when the horizontal pin is withdrawn, the bracket is again rotatable with respect to the middle frame.

15. The mechanic's creeper of claim 13, wherein a horizontal pin is assembled to one of the lateral rods of the back frame by passing through the lateral rod of the back frame and one corresponding said lateral rod of the middle frame, so that the middle frame is fixed in place and prevented from rotating with respect to the back frame, and that when the horizontal pin is withdrawn, the middle frame is again rotatable with respect to the back frame.

16. The mechanic's creeper of claim 13, wherein the bracket is configured to rotate with respect to the middle frame between a position where the bracket is parallel to the middle frame and a position where the bracket is parallel to the back frame.

17. The mechanic's creeper of claim 13, wherein a battery compartment being formed on a bottom surface of the front pad, so that a battery fitted in the battery compartment powers the LED strip light.

* * * * *